US009175744B2

(12) United States Patent
Böhm

(10) Patent No.: US 9,175,744 B2
(45) Date of Patent: Nov. 3, 2015

(54) CABLE CONNECTOR WITH CABLE JOINT

(75) Inventor: Jörg Böhm, Sande (DE)

(73) Assignee: Manitowoc Crane Group France SAS, Dardilly Cedex (FR)

( * ) Notice: Subject to any disclaimer, the term of this patent is extended or adjusted under 35 U.S.C. 154(b) by 110 days.

(21) Appl. No.: 13/879,067

(22) PCT Filed: Oct. 5, 2011

(86) PCT No.: PCT/EP2011/067352
§ 371 (c)(1),
(2), (4) Date: Apr. 26, 2013

(87) PCT Pub. No.: WO2012/049043
PCT Pub. Date: Apr. 19, 2012

(65) Prior Publication Data
US 2014/0041158 A1    Feb. 13, 2014

(30) Foreign Application Priority Data
Oct. 12, 2010  (DE) .................. 10 2010 048 231

(51) Int. Cl.
*F16G 11/09*  (2006.01)
*B66C 1/12*   (2006.01)
*F16G 11/04*  (2006.01)
*F16G 11/10*  (2006.01)

(52) U.S. Cl.
CPC . *F16G 11/09* (2013.01); *B66C 1/12* (2013.01); *F16G 11/04* (2013.01); *F16G 11/10* (2013.01); *Y10T 24/39* (2015.01); *Y10T 24/3936* (2015.01)

(58) Field of Classification Search
CPC ......... F16G 11/04; F16G 11/08; F16G 11/10; B23D 61/185; B66C 1/12; Y10T 24/39; Y10T 24/3936

USPC ............................................. 24/115 R, 132 R
See application file for complete search history.

(56) References Cited

U.S. PATENT DOCUMENTS

| 2,036,172 | A | * | 3/1936 | Gagnon | 24/116 A |
|---|---|---|---|---|---|
| 2,463,116 | A | * | 3/1949 | Lewis | 403/72 |
| 2,493,841 | A | * | 1/1950 | Threewit | 403/56 |
| 3,013,244 | A | * | 12/1961 | Rudy | 439/777 |
| 3,100,323 | A | * | 8/1963 | Baker | 403/353 |
| 3,435,642 | A | * | 4/1969 | Del Pesco | 70/49 |
| 3,977,181 | A | | 8/1976 | Odegard et al. | |

(Continued)

FOREIGN PATENT DOCUMENTS

| DE | 37 657 A | 12/1885 |
|---|---|---|
| DE | 19 00 909 A1 | 8/1970 |

(Continued)

OTHER PUBLICATIONS

Office Action for corresponding German Application No. 10 2011 012 395.4 (English translation provided), dated Jul. 19, 2011, 6 pages.

*Primary Examiner* — Robert J Sandy
*Assistant Examiner* — David Upchurch
(74) *Attorney, Agent, or Firm* — Craig Buschmann; Brinks Gilson & Lione

(57) ABSTRACT

A cable connector includes a first part for receiving a cable end of a first cable and a connecting element for connecting to a second cable, at least one second part which encompasses the first cable, and at least one joint which connects the first part and the second part to each other.

16 Claims, 5 Drawing Sheets

(56) References Cited

U.S. PATENT DOCUMENTS

| | | | |
|---|---|---|---|
| 4,652,166 A * | 3/1987 | Gautron | 403/41 |
| 6,238,126 B1 * | 5/2001 | Dall | 403/114 |
| 6,263,711 B1 * | 7/2001 | Kuo | 70/18 |
| 6,760,941 B2 * | 7/2004 | Coleman, Jr. | 7/170 |
| 7,013,684 B2 * | 3/2006 | Hooks, Jr. | 70/14 |
| 2006/0032275 A1 * | 2/2006 | Hooks, Jr. | 70/58 |
| 2006/0075794 A1 * | 4/2006 | Ling et al. | 70/58 |
| 2006/0231814 A1 * | 10/2006 | Birdsall et al. | 254/323 |
| 2007/0068200 A1 * | 3/2007 | Roloff et al. | 70/30 |
| 2009/0301823 A1 * | 12/2009 | Lin | 188/65.1 |

FOREIGN PATENT DOCUMENTS

| | | |
|---|---|---|
| DE | 25 12 580 A1 | 9/1975 |
| DE | 26 31 636 A1 | 1/1978 |
| DE | 33 07 151 A1 | 9/1984 |
| DE | 200 09 258 U1 | 10/2001 |
| DE | 200 14 596 U1 | 2/2002 |
| FR | 2 282 580 A1 | 3/1976 |
| GB | 363 422 | 12/1931 |
| WO | WO 01/90598 A1 | 11/2001 |

* cited by examiner

CABLE CONNECTOR WITH CABLE JOINT

REFERENCE TO EARLIER FILED APPLICATION

This application is a 371 national phase of PCT/EP2011/067352, filed Oct. 5, 2011, and claims the benefit of German Application No. 10 2010 048 231.5, filed Oct. 12, 2010, the disclosures of which are incorporated, in their entirety, by this reference.

BACKGROUND

The invention relates to a cable connector with one or more cable joint(s), comprising a first part for receiving the cable end of a first cable and comprising a connecting element by which the first part can be connected to a second part. The cable connector also comprises a second part which encompasses the first cable and a joint which connects the first part and the second part to each other.

Crane cables have hitherto usually been crimped at the end, in order to connect them to the feed cable of the cable winch, either in eyes on the crimp or on cable stumps with no crimp. One disadvantage of the known connections is that when the cable end runs over the cable rollers, for example behind the crimp, it is kinked significantly enough under stress that the cable is damaged, or when the cable stumps run over a plurality of cable rollers, they detach completely from the cable. In the former case, this leads to cost-intensive repairs to the crane cable (shortening or re-crimping) and/or storing away crane cables which are ready for use, which likewise increases costs; in the latter case, this can obstruct or even prevent the cable from being fed in. Another disadvantage of the known cable connections is that the run of the cable end is undefined in these systems, hence the behaviour of the cable end with respect to the required clearance on a cable roller cannot be controlled.

DE 1 900 909 A1 discloses a cable connector with two pear sockets which are each connected to a cable end of a first and second cable, respectively, and a coupling piece which connects the two pear sockets to each other such that the two pear sockets can rotate and pivot relative to each other, wherein the pear sockets consist of a plurality of parts which have to be connected by means of screws. DE 34 961 likewise relates to a cable connector with two mounting elements and an intermediate member which connects the two mounting elements to each other such that they can be rotated and pivoted, wherein each of the mounting elements is connected to a cable end of a first and second cable, respectively.

It is therefore an object of the invention to provide a cable connector which is simple to manufacture and simple to assemble in situ and which does not exhibit the disadvantages described.

This object is fulfilled by the cable connector according to claim 1.

BRIEF SUMMARY

The invention relates to a cable connector comprising a first part for receiving a cable end of a first cable and comprising a connecting element for connecting to a second cable, for example the cable of a cable winch, wherein the cable end of the first cable preferably comprises a press-fitted sleeve. The cable connector also comprises at least a second part which when assembled preferably encompasses the first cable in a section near the end held by the first part. Lastly, the cable connector comprises a joint which connects the first part and the second part to each other.

At least one joint section is preferably formed on both the first part and the second part, wherein the joint sections of the first part and the second part together form the joint. The joint sections are preferably each formed on a longitudinal-side end of the first and second part and particularly preferably formed integrally with the first part and the second part.

The first part and the second part can in particular be connected in a positive fit in the joint. Both joint sections can then for example be formed annularly, wherein the rings exhibit different diameters, such that the ring having the smaller diameter is held in the ring having the larger diameter. One or both of the joint sections can also be formed spherically with a passage for the cable, wherein one of the joint sections is again held in the other in order to connect the first part and the second part. Alternatively, it is also possible for only one of the joint sections to be formed spherically or annularly, while the other joint section exhibits a shape which the spherical or annular joint section can engage with and be held by. Lastly, the joint sections can also be formed elliptically, ovally or polygonally or can exhibit another shape which can together form an articulated joint for the cable connector.

If the cable connector comprises more than one second part, for example two second parts arranged sequentially as viewed in the cable direction, then each of these second parts comprises two joint elements each, wherein the two joint elements preferably form the front and rear end of the second part as viewed in the longitudinal direction. The front end of the first second part can then, as previously described, be connected to the first part, and the second end of the first second part can form another joint for the cable with one end of the second part. The joint connecting the two second parts is also formed by a purely positive fit. The same applies if for example three or more second parts are arranged sequentially. If more than one second part is provided, all the second parts are preferably identical, wherein the end of the second parts facing away from the first part is shaped such that it can captively hold an end of another second part facing the first part.

The first part of the cable connector and/or the second part of the cable connector can (each) be formed from at least two partial shells, preferably two half shells. Instead of two half shells, it is also possible, though less preferred, for three, four or more partial shells to form the first and/or second part. Each of the partial shells preferably also comprises a part of the joint section, i.e. the half shell including the joint section is formed integrally.

It is particularly advantageous if the at least two partial shells which form the first part have the same shape, i.e. are identical, and/or if the at least two partial shells which form the second part have the same shape, i.e. are identical, wherein "identical" means that the partial shells, which can for example be formed from metal or plastic, can be manufactured in a machining method in a machine using the same machining program or are formed in a casting method in the same die. In the case of a first part consisting of two half shells, this means for example that it is not necessary to make sure that a first partial shell and a second partial shell which is different to the first partial shell are available in order to form the first part of the cable connector; it is sufficient to ensure that at least two partial shells are available. If one of the partial shells is damaged, it can be replaced with any other partial shell for a first part. It is therefore only necessary to stock identical partial shells for the first part of the cable connector, which reduces the number of parts to be stored and thus makes stockpiling easier and cheaper. The same correspondingly applies to the partial shells of the second part.

The partial shells for the first part and/or the partial shells for the second part are then preferably shaped such that the first part and correspondingly the second part can be formed by a positive fit and/or force fit between the respective partial shells. Particularly preferably, a purely positive fit such as for example a bayonet lock is sufficient in order to connect identical partial shells to each other. This connection can for example be established by a combined movement consisting of a rotation and a linear movement which are performed simultaneously, i.e. mutually dependently, or consecutively. Additionally or alternatively, a tilting movement can also be necessary in order to establish the positive fit.

The second part is preferably held in the first part when the cable connector is completely assembled, i.e. the joint section of the second part engages with the first part in order to establish the joint connection. In other words, the joint section of the first part encompasses the joint section of the second part, wherein the second part is captively held in the first part once the joint connection has been established. Preferably, the joint section of the first part is formed annularly with a concave inner surface, and the joint section of the second part is formed substantially spherically or partially spherically, and the joint formed by them is a spherical joint or an articulated joint. In the case of the first part in particular, it is also possible for only the inner side, i.e. the opposing surface of the joint for the joint section of the second part, to exhibit a corresponding shape, while the outer circumference of the body of the first part is for example substantially cylindrical, wherein the concave inner surface of the joint section of the first part exhibits a maximum diameter which is slightly larger than the maximum outer diameter of the joint section of the second part. The diameter of the joint section of the first part decreases towards the sides, parallel to the diameter of the joint section of the second part, such that the joint section of the second part is trapped in the joint section of the first part in the linear direction of the cable connector, and the positive fit between the partial shells of the second part is maintained even during any rotation of the first part and/or the second part about its longitudinal axis. The same applies if two or more second parts are arranged sequentially and connected to each other and each connection between two second parts likewise forms a joint for the cable.

The joint section of the second part then lies in the joint section of the first part and can be freely rotated in the joint section of the first part, relatively about the longitudinal axis of the cable connector, and pivoted at an angle to the longitudinal axis. The maximum pivoting angle can be predetermined by the design of the cable connector, by shaping the first part or the second part or both parts such that the pivoting in the joint is limited to angles which are within the permissible bending range of the cable. The first part and the second part can in particular be shaped such that an end of the first part facing away from the connecting element abuts against an abutment surface formed on the second part as or before the maximum permissible bend in the cable is reached, such that it is impossible for the cable to bend further beyond this range. It is also conceivable for limiting abutments to be specially connected, detachably, to the first and/or second part in order to be able to use the cable connector with cables having different permissible bending ranges.

The end of the first part opposite the joint section comprises a connecting element, for example a lug or a projection comprising a bore, through which the second cable or a connector, for example a shackle, can engage in order to connect the cable connector or the first part of the cable connector to for example the cable of a cable drum. Since the partial shells of the first part are identical, as described above, each of the partial shells comprises such a connecting element. The connector can simultaneously also serve to secure the positive-fit connection between the partial shells of the first part, which is established as soon as the connecting elements are held together by the second cable or the connector, such that they can no longer fold apart by themselves or can only fold apart to an extent which is restricted by the second cable or the connector. It is then no longer possible for the positive-fit connection of the first part to be independently released, which also prevents the second part from moving out of the joint connection with the first part, which in turn means that the positive-fit connection between the partial shells of the second part cannot be released.

The first part and/or second part preferably exhibit(s) an outer shape or outer contour which allows the cable connector to be guided by a cable roller as it runs over said cable roller, i.e. allows it to run over the cable roller in a defined way. This prevents the cable connector from moving over the cable roller in an undefined way and occupying more design space than necessary. This has a positive effect on the operating speed and operating reliability. By preventing kinks as compared to the conventional solutions, the limit values of the permissible cable pull are much higher and are generally only then limited by the feed cable. The joint connection between the first part and the second part is also preferably configured such that the necessary space in terms of width and diameter required for the joint can be kept as small as possible. A cable connector with no joint would have to be almost twice as wide in order to achieve a comparable bending radius for the cable.

The second part preferably exhibits an inner contour which is arched as viewed in a feed direction of the first cable and defines a bending circle for the first cable which prevents the first cable from kinking too much and thus reduces the risk of damage to the first cable due to kinking and increases the period of use of the first cable.

In summary, the cable connector in accordance with the invention can therefore exhibit at least the following advantages over known cable connectors:

it is assembled by plugging and turning;

all the parts of the cable connector are secured to each other via a (purely) positive fit;

there are no small parts such as screws or threads which can become soiled or lost;

it is ensured that the cable will only be bent up to a permissible bending limit;

it is ensured that the cable connector will run over the cable rollers in a defined way;

identical partial shells which can be plugged together;

only one screw connection (for connecting to the cable of the cable winch);

the partial shells, once cast, do not need to be mechanically finished.

The cable connector can in particular be the cable connector which connects a crane cable to the cable of a cable winch.

In the following, an embodiment is explained in more detail on the basis of figures. Any of the features which are essential to the invention and shown in the figures can, individually or in combination, further develop the invention and form part of the scope of the invention, which is not however limited to the example embodiment shown.

DETAILED DESCRIPTION

Figure 1:
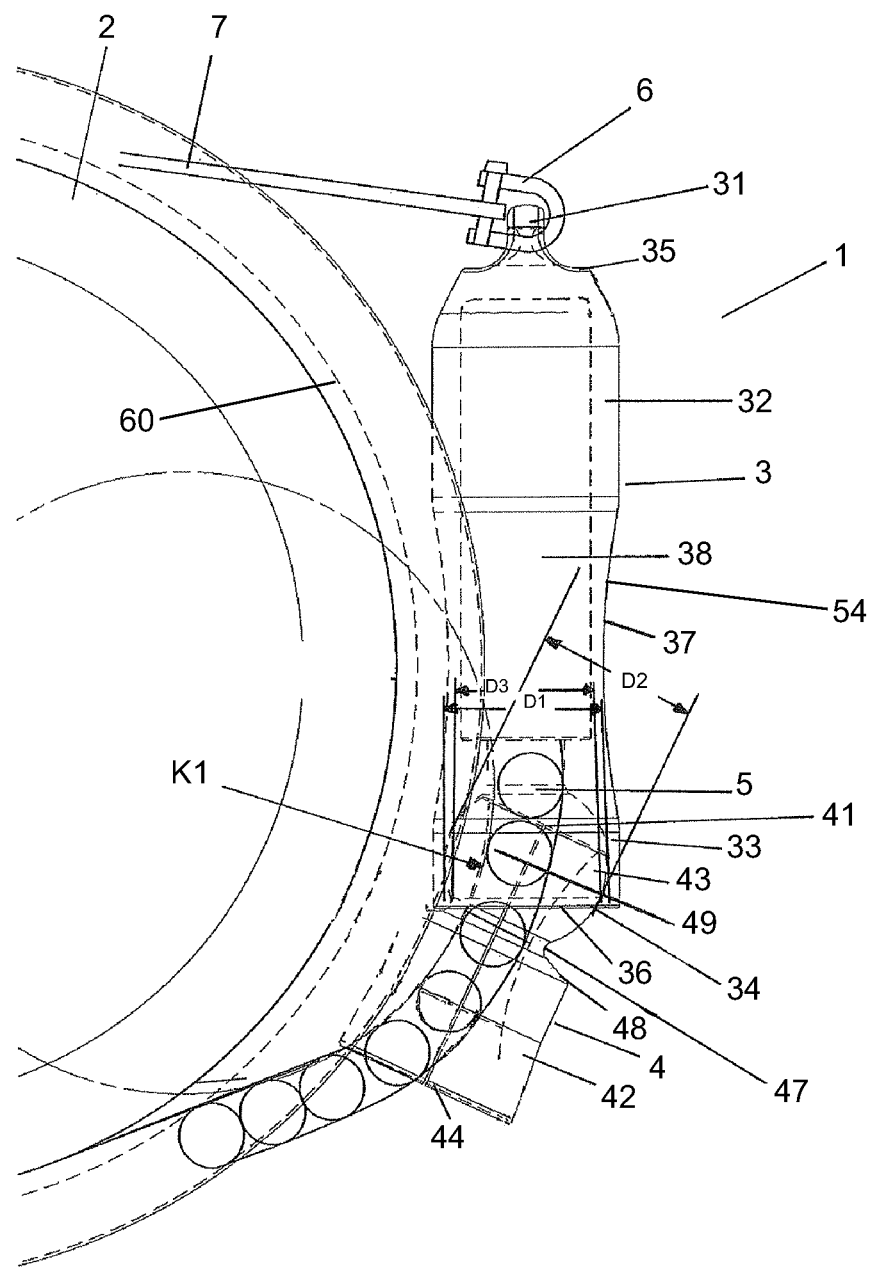
FIG. 1 a cable connector running over a cable roller.

FIG. 1 shows an embodiment of a cable connector 1 in accordance with the invention, running over a cable roller 2. The cable connector 1 consists of a first part 3 and a second part 4.

The first part 3 comprises: at one end 35, a connecting element 31 in the form of a projection comprising a bore or a lug; a main body 32; a joint section 33; and at the other end, an opening 34. The outer contour 54 of the first part 3 is adapted to the shape of the running surface 60 of the cable roller 2, at least in a section 37. One end of a first cable 5 is indicated in the main body 32 of the first part 3 by dashed lines, wherein the end of the first cable 5 comprises a sleeve which is for example press-fitted or adhered onto the cable end or otherwise connected to the cable end. The connecting element 31 is connected to a second cable 7, for example a feed cable of a cable drum, by means of a shackle 6.

The second part 4 of the cable connector 1 comprises: an opening 41; a body 42; and a joint section 43 comprising an opening 44. The first cable 5 is guided through the second part 4, i.e. the second part 4 surrounds the first cable 5 and serves mainly as a guide for the first cable 5. To this end, the second part 4 exhibits an inner contour which forms a guiding surface 49 and guides the first cable 5 in an arc from the first end 45 (FIG. 2) or inlet into the second part 4 to the second end 46 or outlet out of the second part 4.

The joint section 33 of the first part 3 and the joint section 43 of the second part 4 together form a joint 50 (labelled in FIG. 4) of the cable connector 1, wherein the joint section 33 exhibits an inner contour which substantially corresponds to the outer contour of the joint section 43, wherein the joint section 33 at least partially encompasses the joint section 43, and wherein the joint section 43 is captively held in the joint section 33.

In the example embodiment shown, the joint section 33 of the first part 3 exhibits a partially spherical contour, or the contour of a concave ring, having an inner diameter D1. An opening 34 in the joint section 33 has a diameter D3. The joint section 43 of the second part 4 likewise exhibits a partially spherical contour, or the contour of a convex ring, having an outer diameter D2 which is slightly smaller than the inner diameter D1 but larger than the diameter D3. The joint section 43 can thus be rotated about the longitudinal axis of the cable connector 1, and pivoted laterally away from the longitudinal axis, in the joint section 33.

The maximum angle by which the joint 50 can be pivoted relative to the longitudinal axis of the cable connector 1 is predetermined by the configuration of the cable connector 1 or the first part 3 and/or second part 4 and should not be larger than a maximum permissible bend in the first cable 5. In FIG. 1, a second end 36 of the first part 3 and an annular groove 47 formed on the second part 4 between the joint section 43 and the body 42 form an abutment 52 (labelled in FIGS. 2 and 3) with an oblique surface 48, wherein the abutment 52 limits the tilting angle of the joint 50.

The cable connector 1 comprising the joint 50 guides the first cable 5 such that it does not kink as it runs over the cable roller 2 but is rather guided in a bending circle K1 which can be determined as a function of the material properties of the first cable 5, wherein the radius of the bending circle K1 is also determined by the guiding surface 49 for the first cable 5 in the second part 4.

The cable connector 1 or at least the first part 3 of the cable connector 1 exhibits—at least in the section 37—an outer contour 54 which causes the cable connector 1 to run over the cable roller 2 or a plurality of cable rollers in a defined way.

Figure 2:
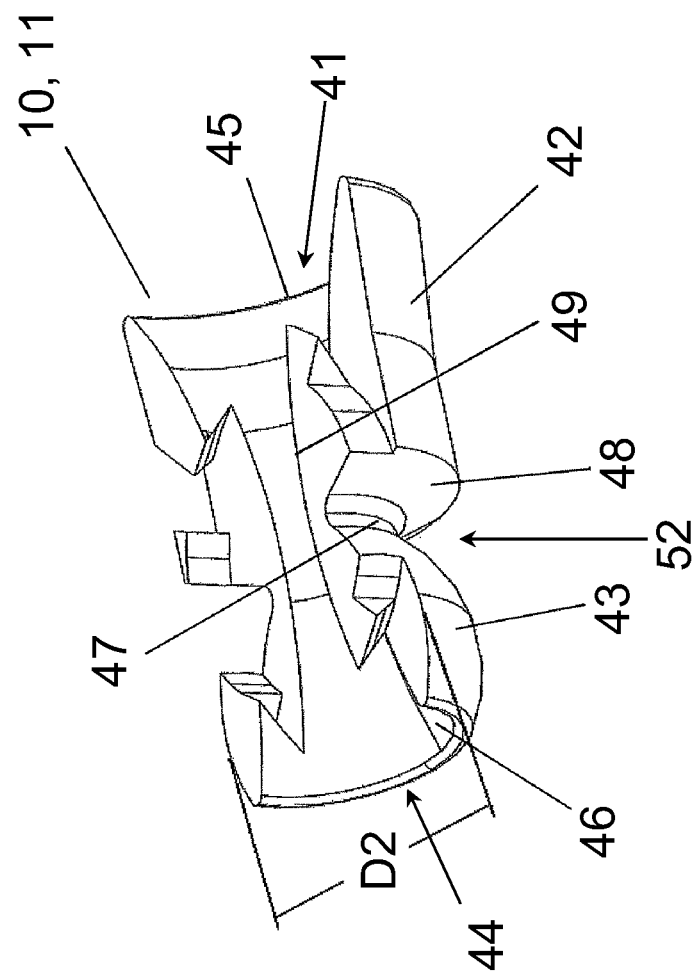
FIG. 2 a partial shell of the second part.
Figure 3:
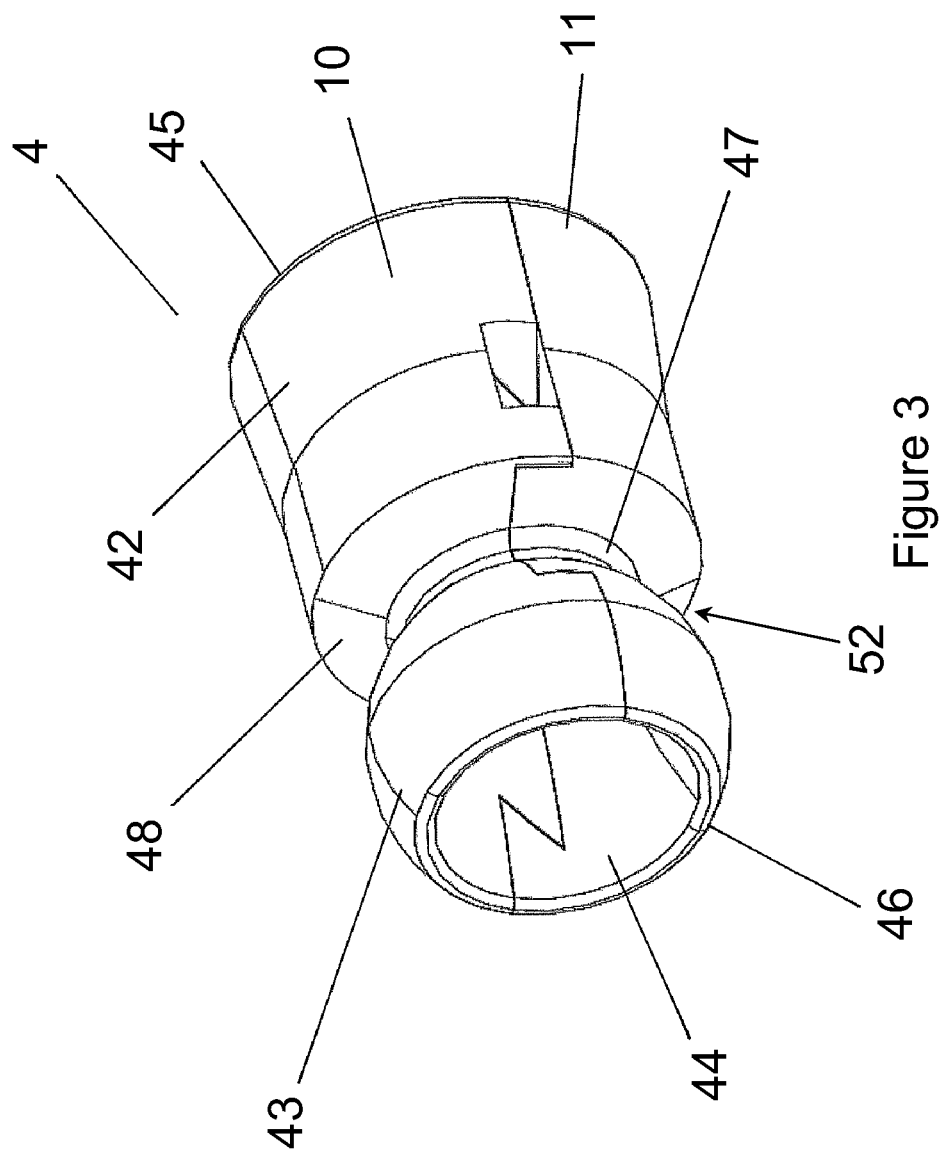
FIG. 3 a second part consisting of two identical partial shells, connected.

FIG. 2 shows a half shell 10, 11 of a second part 4 which, as shown in FIG. 3, is constructed from two identical half shells 10 and 11. The half shell 10 consists of a part of the joint section 43 and a part of the body 42, as well as a part of the opening 41 at the first end 45 and a part of the opening 44 at the second end 46, respectively. The arched inner contour, which serves as a guide, or guiding surface 49, for the first cable 5 within the second part 4, can be clearly seen. In the example embodiment shown, the half shell 10 comprises connecting structures which need not be described in every detail but which are embodied such that they can be joined together with identical connecting structures of a second half shell 11 in a positive fit, to form the second part 4, wherein for example protrusions on the connecting structure of the half shell 10 engage with cavities in the connecting structure of the half shell 11 and vice versa.

In order to assemble the second part 4 around the cable 5, the half shells 10, 11 are simply placed onto each other and then turned relative to each other, thus establishing the positive fit, wherein the first cable 5 is positioned between the two half shells 10, 11, such that the completely assembled part 2 can be shifted linearly on the first cable 5.

Figure 4:
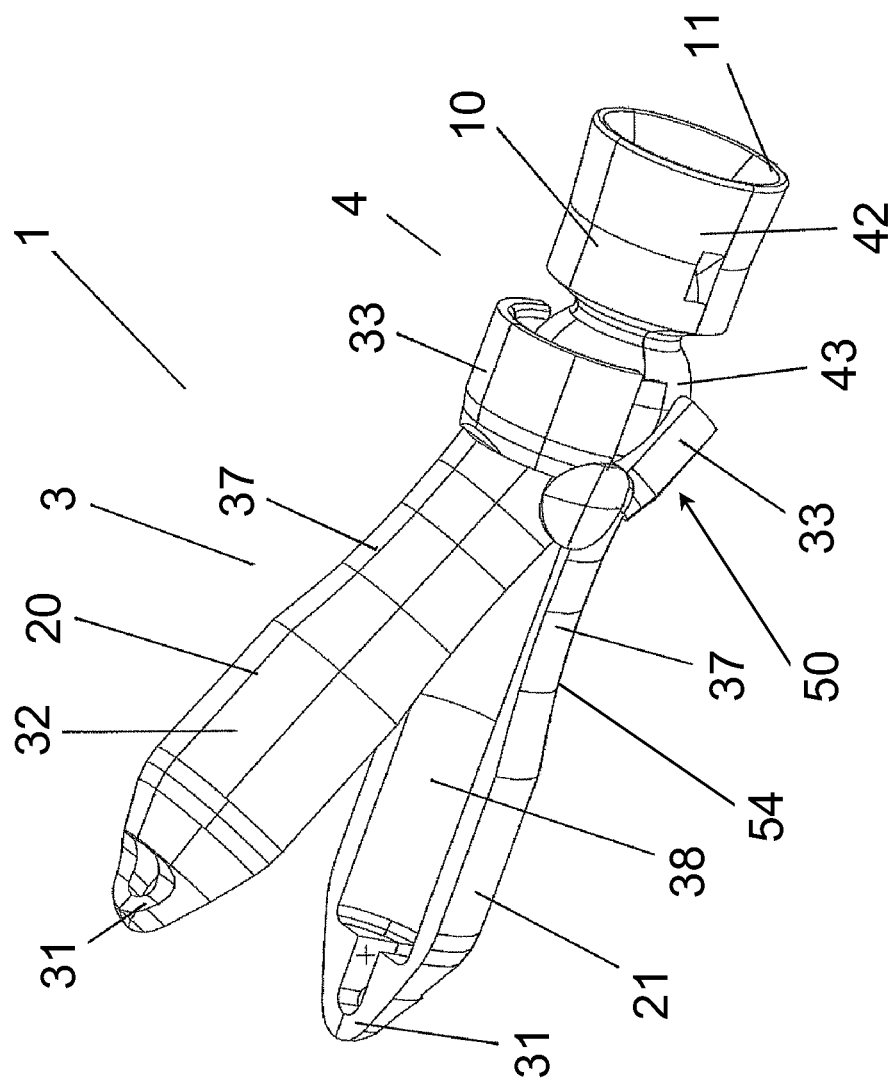
FIG. 4 the cable connector shortly before it is completely assembled.

The same substantially applies to the first part 3 of the cable connector 1. The first part 3 of the cable connector 1 is also formed from identical partial shells 20, 21, preferably identical half shells 20, 21, by way of a purely positive fit between the half shells 20, 21. As can be seen in FIG. 4, the two partial shells 20, 21 are not however placed onto each other and then turned relative to each other, but rather the half shell 20 is plugged together with the half shell 21 in the region of the partial joint sections (once the cable end of the first cable 5 has been inserted) and then folded together. The connector 6 shown in FIG. 1, which can connect the cable connector 1 to the second cable 7, serves to secure the half shells 20, 21 against folding apart during operation.

Before the two half shells 20, 21 are folded together to form the first part 3 of the cable connector 1, the second part 4 or the joint section 43 is positioned such that the joint section 33 of the first part 3 at least partially surrounds and captively grips the joint section 43 when folded together or closed.

When folded together, the half shells 20, 21 of the first part 3 form a hollow space 38 in the region of the body 32, wherein a cable end of the first cable 5 can be inserted into said hollow space 38. The cable end has to exhibit a larger diameter than the first cable 5, wherein the larger diameter has to be larger than the diameter D3 of the opening 34 at the first end 36 of the first part 3, so that the first cable 5 cannot slide out of the cable connector 1. To this end, a sleeve can be press-fitted, adhered or otherwise fastened onto the cable end, or the first cable 5 can be reinforced with a back splice or end splice or simply bent round at the end. Clamping elements, which for example consist of two half shells and are fastened to the cable end, can also ensure that the first cable 5 does not slide out of the cable connector 1. Lastly, the first part 3 of the cable connector 1 can also comprise tips or barbs which protrude inwards into the space 38 and press into the cable end when the first part 3 is folded together, thus securing the first cable 5 in the first part 3.

Completely assembled, the folded-together first part 3 is secured against folding open by the connector 6; the second part 4 is trapped in the joint section 33 of the first part 3 in the region of its joint section 43, such that the two half shells 20, 21 can only be rotated together, thus securely preventing the positive-fit connections between the first part 3 and the second part 4 from being released.

Figure 5A:
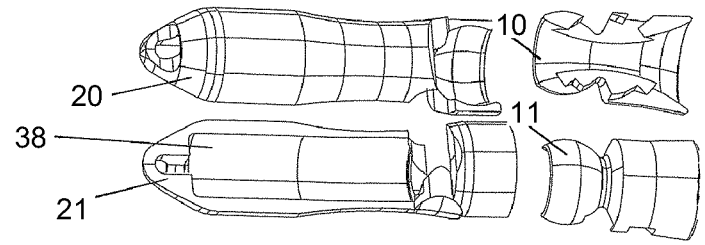
FIGS. 5A-5E the assembling sequence of the cable connector.

FIGS. 5A-5E shows an assembling sequence of the cable connector 1. In FIG. 5A, the two half shells 20, 21 of the first part 3 and the two half shells 10, 11 of the second part 4 are lying next to each other. They are respectively identical half shells, i.e. the half shell 10 is identical to the half shell 11 and the half shell 20 is identical to the half shell 21.

Figure 5B:
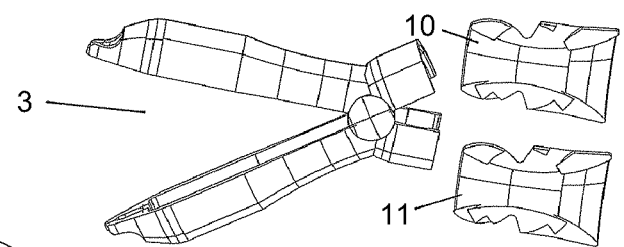
Figure 5C:
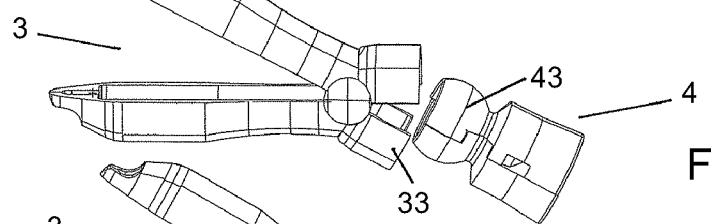
Figure 5D:
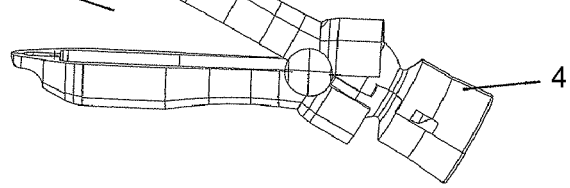
Figure 5E:
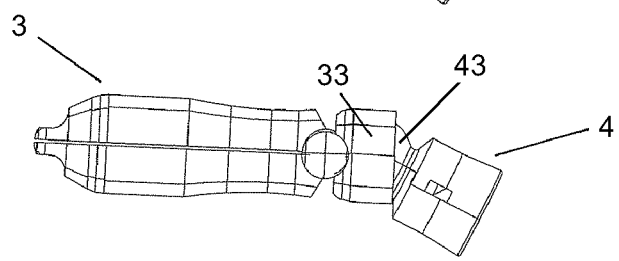

In a first step shown in FIG. 5B the two partial shells 20, 21 are plugged together to form the first part 3, but not yet folded together, such that a pincer-like structure results. Before the two partial shells 10, 11 are plugged together, the end of the first cable 5 (not shown) is inserted into the first part 3. In the next step, shown in FIG. 5C, the half shells 10, 11 (enclosing the first cable 5) are placed onto each other and turned. The joint section 43 of the completely assembled second part 4 is then slid (along the axis of the cable) into the joint section 33 of the first part 3 (FIG. 5D). Finally, as shown in FIG. 5E, the half shells 20, 21 are folded together, such that the joint section 43 of the second part 4 is then captively connected to the joint section 33 of the first part 3. The cable connector 1 can then be connected to the second cable 7 at the connecting element 31, whereby the half shells 20, 21 of the first part 3 can no longer fold apart.

LIST OF REFERENCE SIGNS

1 cable connector
2 cable roller
3 first part
4 second part
5 first cable
6 connector
7 second cable
10 half shell
11 half shell
20 half shell
21 half shell
31 connecting element
32 main body
33 joint section
34 opening
35 end
36 end
37 section
38 space
41 opening
42 body
43 joint section
44 opening
45 end
46 end
47 annular groove
48 oblique surface
49 guiding surface
D1 diameter
D2 diameter
D3 diameter
K1 bending circle

The invention claimed is:

1. A device comprising a cable connector and a first cable, the cable connector comprising:
   a) a first part which receives a cable end of the first cable and comprising a connecting element for connecting to a second cable;
   b) at least one second part having a first end and a second end, wherein the at least one second part encompasses the first cable and has a first opening on the first end and a second opening on the second end, wherein the first cable is guided through the at least one second part and extends through the first opening and the second opening; and
   c) at least one joint which connects the first part and the second part to each other.

2. The device of claim 1, wherein the first part comprises a joint section and the second part comprises at least one joint section, and the joint section of the first part and the at least one joint section of the second part together form the at least one joint of the cable connector.

3. The device of claim 1, wherein the first part is adapted to be connected to the second part by way of a positive fit in the at least one joint.

4. The device of claim 1, wherein the first part is formed from at least two partial shells.

5. The device of claim 4, wherein the at least two partial shells that form the first part have the same shape.

6. The device of claim 4, wherein the first part is adapted to be formed by way of a positive fit between the at least two partial shells of the first part.

7. The device of claim 1, wherein a joint section of the first part at least partially encompasses a joint section of the second part.

8. The device of claim 1, wherein the second part forms an abutment for an end of the first part facing away from the connecting element, wherein said abutment limits a tilting angle of the joint.

9. The device of claim 1, wherein at least the first part includes an outer contour adapted to a running surface of a cable roller, at least in a section of the first part, so that the cable connector is guided on the cable roller as the first part runs over the cable roller during operation.

10. The device of claim 1, wherein the first part of the cable connector and the second part of the cable connector and the joint that connects the first part and the second part to each other are adapted to be assembled to form the cable connector without any tools.

11. The device of claim 1, wherein the first cable is a crane cable, and the cable connector connects the crane cable to a cable of a cable winch.

12. The device of claim 1, wherein the at least one second part is formed from at least two partial shells.

13. The device of claim 12, wherein the at least two partial shells that form the second part have the same shape.

14. The device of claim 12, wherein the second part is adapted to be formed by way of a positive fit between the at least two partial shells of the second part.

15. A cable connector, comprising:
   a) a first part for receiving a cable end of a first cable and comprising a connecting element for connecting to a second cable;
   b) at least one second part having a first end and a second end, wherein the at least one second part is adapted to encompass the first cable and has a first opening on the first end and a second opening on the second end, such that the first cable is able to be guided through the at least one second part and to extend through the first opening and the second opening; and c) at least one joint which connects the first part and the second part to each other;

wherein a joint section of the first part at least partially encompasses a joint section of the second part.

16. A cable connector, comprising:

a) a first part for receiving a cable end of a first cable and comprising a connecting element for connecting to a second cable;

b) at least one second part having a first end and a second end, wherein the at least one second part is adapted to encompass the first cable and has a first opening on the first end and a second opening on the second end, such that the first cable is able to be guided through the at least one second part and to extend through the first opening and the second opening; and c) at least one joint which connects the first part and the second part to each other;

wherein the first part comprises a joint section and the second part comprises at least one joint section, and the joint section of the first part and the at least one joint section of the second part together form the at least one joint of the cable connector.

\* \* \* \* \*